(12) United States Patent
Ito

(10) Patent No.: US 7,307,414 B2
(45) Date of Patent: Dec. 11, 2007

(54) BEARING WITH INTEGRATED ROTATION SENSOR

(75) Inventor: Hiroyoshi Ito, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/709,257

(22) Filed: Feb. 22, 2007

(65) Prior Publication Data
US 2007/0205759 A1 Sep. 6, 2007

(30) Foreign Application Priority Data
Mar. 1, 2006 (JP) .............................. 2006-055195

(51) Int. Cl.
*G01P 3/44* (2006.01)
*G01B 7/30* (2006.01)
(52) U.S. Cl. .................. 324/174; 324/207.25; 384/448
(58) Field of Classification Search ........ 324/173–174, 324/207.25; 73/514.01, 514.02, 514.16, 73/514.31, 514.39; 384/448
See application file for complete search history.

(56) References Cited

U.S. PATENT DOCUMENTS 6,011,388 A * 1/2000 Miyazaki et al. .......... 324/174
6,127,819 A * 10/2000 Ouchi ........................ 324/173
6,882,142 B2 * 4/2005 Koike et al. ................ 324/174

FOREIGN PATENT DOCUMENTS

JP 2004-101312 4/2004

* cited by examiner

*Primary Examiner*—Bot LeDynh

(57) ABSTRACT

To provide a bearing with integrated rotation sensor capable of detecting the rotational speed and the origin position without being affected by an external magnetic field, the bearing includes a rotating ring, a magnetic encoder 7 mounted on the rotating ring, and a stationary ring. The magnetic encoder 7 includes a ring shaped rotational speed to-be-detected member 7A having a plurality of magnetic poles alternating with each other, and a origin position to-be-detected element 7Ba arranged axially in a portion of the circumferential direction of the to-be-detected member 7A. Rotational speed and origin position magnetic sensors are mounted on the stationary ring so as to respectively confront the rotational speed and origin position to-be-detected elements. A magnetized restoration element 7Bb is disposed in a circumferential portion of the magnetic encoder 7, where it confronts the origin position magnetic sensor, and except the second to-be-detected member 7Ba.

5 Claims, 6 Drawing Sheets

Fig. 3A
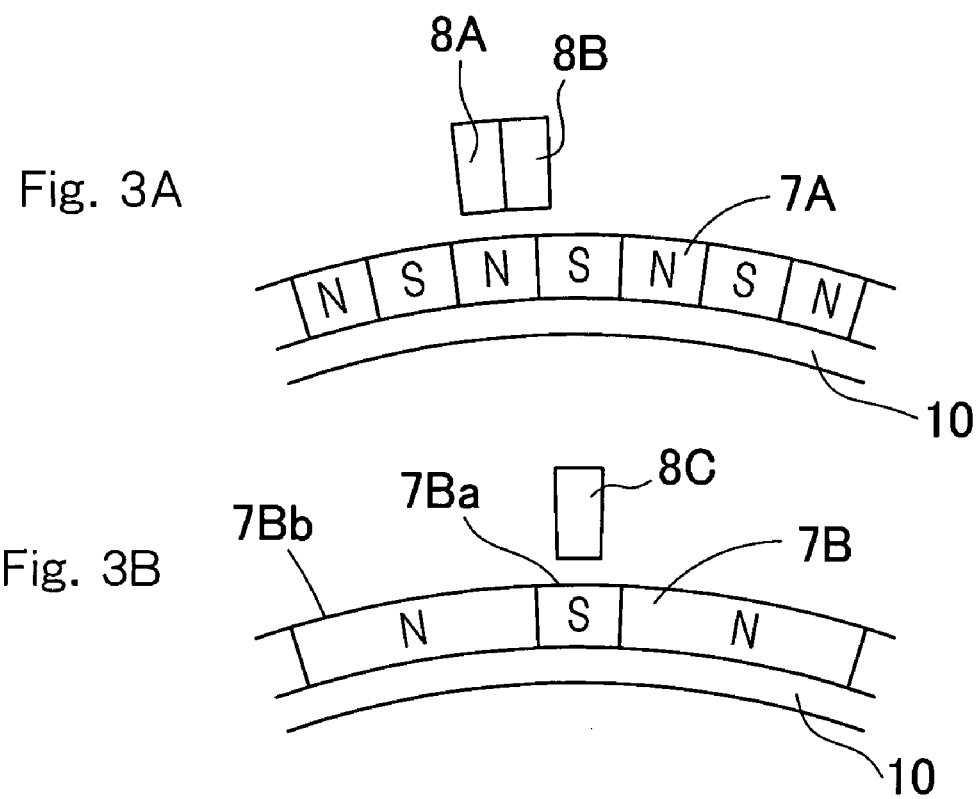
Fig. 3B
Fig. 4
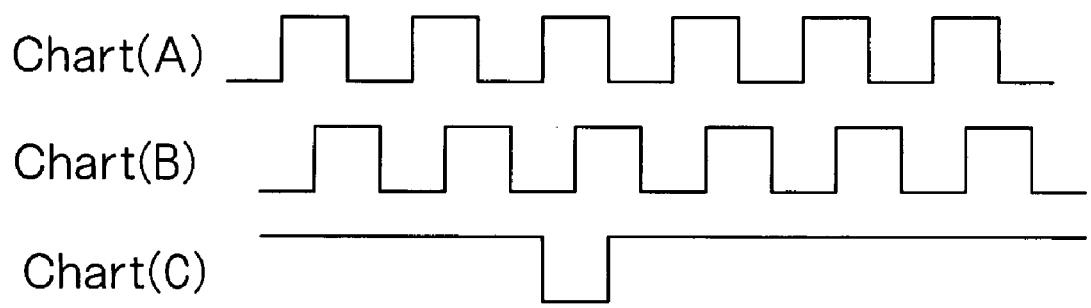

BEARING WITH INTEGRATED ROTATION SENSOR

BACKGROUND OF THE INVENTION

1. Field of the Invention

The present invention relates to a bearing with integrated rotation sensor which may be used in electric motors and other various equipments.

2. Description of the Prior Art

The bearing with integrated rotation sensor of a kind referred to above is largely used in an application for detection of, for example, the rotational speed (the number of revolutions) or the direction of rotation and, in such case, the sensor output system is a two phase system capable of outputting an A phase signal and a B phase signal. The two phase signals are in the form of an incremental pulse signal and the rotational speed can be detected in reference to one of those two phase signals. Also, a phase difference of 90° is given between the A phase signal and the B phase signal and the phase difference can be utilized to detect the direction of rotation.

In the sensor output system of the kind discussed above, detection of the rotation angle requires an addition of a zero point position signal (a Z phase signal) descriptive of the position of origin with respect to the direction of rotation, other than the above discussed two phase signals. In such case, it is a general practice to detect the rotation angle from the position of origin in reference to the relation between one of the A and B phase signals and the Z phase signal.

As a magnetic encoder that is used in the rotation sensor having such a capability of detecting the rotation, the Japanese Laid-open Patent Publication No. 2004-101312, published Apr. 2, 2004, discloses such a type as shown in FIG. 10. In this known magnetic encoder 17 shown therein, a first to-be-detected member 17A necessary to obtain the A phase signal and the B phase signal and a second to-be-detected member 17B necessary to obtain the Z phase signal are arranged in an outer periphery of a cylindrical metal core 20 in side-by-side relation in a direction axially of the metal core 20. The first to-be-detected member 17A is in the form of a ring-shaped magnet having a plurality of alternating magnetic poles N and S deployed in a direction circumferentially of the metal core 20 and having a uniform thickness in a radial direction over the entire circumference thereof. On the other hand, the second to-be-detected member 17B is in the form of a magnet connected with the first to-be-detected member 17A and including a thick walled portion of a thickness equal to that of the first to-be-detected member 17A and having one of the alternate magnetic poles, for example, a magnetic pole S. The remaining circumferential portion of the second to-be-detected member 17B is a thin walled portion of a thickness smaller than that of the thick walled portion. By so constructing, when works to magnetize the first and second to-be-detected members 17A and 17B to form the respective magnetic poles are carried out simultaneously, the plurality of the alternating magnetic poles can be formed in the first to-be-detected member 16A so as to deploy in the circumferential direction of the metal core 20 and, at the same time, the magnetic pole can be formed only in the thick walled portion of the second to-be-detected member 17B. The thick walled portion of the second to-be-detected member 17B may have a magnetic north (N) pole on each side of the magnetic south (S) pole in a direction circumferentially of the metal core 20.

The known magnetic encoder 17 of the structure described above is fixed on, for example, an outer periphery of an inner race which forms a rotating ring of a bearing, and, as shown in FIG. 11, an outer race which forms a stationary ring of the bearing is provided with two magnetic sensors 18A and 18B held in face-to-face relation with the first to-be-detected member 17A for the detection of an A phase signal and a B phase signal, respectively, and also with a magnetic sensor 18C held in face-to-face relation with the second to-be-detected member 17B for the detection of a Z phase signal. The two magnetic sensors 18A and 18B are arranged spaced a distance from each other in the circumferential direction so that respective output signals from those magnetic sensors 18A and 18B can have a phase difference of, for example, 90°.

In the bearing with integrated rotation sensor so constructed as hereinabove described, as the bearing inner race rotates, the two magnetic sensors 18A and 18B for detecting the magnetic poles N and S in the first to-be-detected member 17A output the A phase signal and the B phase signal, which are offset a phase difference of 90° relative to each other, respectively. Also, the magnetic sensor 18C for the detection of the Z phase signal operates in such a manner that each time the bearing inner race undergoes one complete rotation, it will not detect any magnetism in a region of rotation confronting the thin walled portion of the second to-be-detected member 17B as shown in FIG. 11A, but will detect a magnetism in a region of rotation confronting the thick walled portion as shown in FIG. 11B to thereby output the Z phase signal at one time. In this way, the rotational speed, the direction of rotation and the position of origin can be detected.

In the magnetic encoder 17 of the structure hereinabove described, since a circumferential portion of the second to-be-detected member 17 other than the thick walled portion is formed as a thin walled portion having a weak magnetic force, the magnetic sensor 18C for the detection of the Z phase signal is not affected by the magnetic field emanating from the magnetic encoder 17 when the magnetic sensor 18C is brought in position to confront the thin walled portion of the second to-be-detected member 17. Where the bearing with integrated rotation sensor utilizing this magnetic encoder 17 is used as built in, for example, an electrical drive motor, and when the magnetic field leaking from the electric drive motor acts on the bearing with integrated rotation sensor, the magnetic field entering the inside of the bearing may extend through the magnetic encoder 17. In such case, since the thin walled portion in the second to-be-detected member 17B does not work as a magnetic encoder sufficiently as hereinbefore described, it will be dominated by only the magnetic field entering from the outside and will be held in a state as if the magnetic field is generated from the magnetic encoder 17. Under these circumstances, the magnetic sensor 18C for the detection of the Z phase signal may detects a magnetism, which has entered from the outside, at the thin walled portion in the second to-be-detected member 17B and, therefore, it will erroneously output a plurality of pseudo Z phase signals for each complete rotation, instead of outputting one Z phase signal per one complete rotation.

SUMMARY OF THE INVENTION

In view of the foregoing, the present invention has for its primary object to provide a bearing with integrated rotation sensor of a type capable of detecting the rotational speed and the position of origin without being adversely affected by an external magnetic field.

In order to accomplish the foregoing object, the present invention provides a bearing with integrated rotation sensor including a rotating ring, a magnetic encoder mounted on the rotating ring and including a ring-shaped rotational speed to-be-detected member for use in detection of a rotational speed, which has a peripheral surface formed with a plurality of magnetic poles alternating relative to each other in a direction circumferentially thereof, and an origin position to-be-detected element for use in detection of an origin position axially juxtaposed to a portion of a circumferential direction of the rotational speed to-be-detected member, a stationary ring, and a rotational speed magnetic sensor for use in detection of the rotational speed and an origin position magnetic sensor for use in detection of the origin position, both mounted on the stationary ring and arranged so as to confront radially the rotational speed and origin position to-be-detected elements, respectively. The magnetic encoder further includes a magnetized restoration element for use in restoration disposed in a axial portion thereof confronting the origin position magnetic sensor, and in an entire circumferential portion except the origin position to-be-detected element, for rendering the origin position magnetic sensor to be held in a non-detection level.

The magnetized restoration element has a magnetic pole opposite to the origin position to-be-detected element, and the origin position to-be-detected element is magnetized to, for example, a magnetic S pole and the magnetized restoration element is magnetized to a magnetic N pole.

According to the present invention, when the rotational speed to-be-detected member of the magnetic encoder is detected by the magnetic sensor for use in detection of the rotational speed, the rotational speed of the rotating ring can be detected. Also, when the origin position to-be-detected element of the magnetic encoder is detected by the magnetic sensor for use in detection of the rotational speed, the position of origin of the rotating ring in the circumferential direction thereof can be detected.

Since a portion of the entire circumference of the magnetic encoder, except the origin position to-be-detected element, is rendered to be the magnetized restoration member, during one complete rotation of the rotating ring the magnetic sensor is restored to the non-detection state subsequent to outputting of one original position detection signal after the magnetic sensor for use in detection of the position of origin has detected the origin position to-be-detected element and before the origin position to-be-detected element is detected next time, and, therefore, the non-detection state can be retained assuredly. Therefore, even though external magnetic fields leak from outside into the bearing with integrated rotation sensor, the latter will not result in an erroneous operation under the influence of the external magnetic field and can assuredly output the position-of-origin detection signal one time during each complete rotation of the rotating ring.

In one preferred embodiment of the present invention, the magnetic encoder is so constructed that the origin position to-be-detected element is employed as a component part separate from a magnetic encoder main body forming the remaining portion of the magnetic encoder, wherein the magnetic encoder main body includes a cylindrical metal core having an outer periphery thereof provided with the rotational speed to-be-detected member and the magnetized restoration element, and wherein a portion for receiving the origin position to-be-detected element is represented by a depression and the component part, which eventually forms the origin position to-be-detected element, is fitted inside the depleted depression.

By manufacturing the origin position to-be-detected element as a member separate from any other portion of the magnetic encoder, the second to-be-detected member can be apparently discerned from any other portion and alignment of the origin position to-be-detected element relative to the magnetic sensor for use in detection of the position of origin in the circumferential direction can be facilitated.

In another preferred embodiment of the present invention, the magnetic encoder may be so constructed that the magnetized restoration element is employed as a component part separate from a magnetic encoder main body forming the remaining portion of the magnetic encoder and the magnetic encoder main body may include a cylindrical metal core having an outer periphery thereof provided with the rotational speed to-be-detected member. The origin position to-be-detected element may be provided in a circumferential portion thereof in a form of a projection protruding axially from the rotational speed to-be-detected member and a component part, which will eventually form the magnetized restoration element, may be so shaped as to represent a generally C-shaped configuration having a depleted portion and is mounted on the outer periphery of the magnetic encoder main body so that the depleted portion can receive therein the origin position to-be-detected element in the magnetic encoder main body, which protrude radially outwardly.

Thus, even where the magnetized restoration element is prepared as a component part separate from any other portions of the magnetic encoder, the appearance of the origin position to-be-detected element can be discerned from any other portions and, therefore, alignment in position in the circumferential direction relative to the magnetic sensor for use in detection of the position of origin can be easily accomplished.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3A is an explanatory diagram used to explain the relation in position between a first to-be-detected member of the magnetic encoder and magnetic sensors;

FIG. 3B is an explanatory diagram used to explain the relation in position between a second to-be-detected member of the magnetic encoder and a magnetic sensor;

FIG. 4 illustrates respective waveforms of detection signals outputted from two magnetic sensors for the detection of a rotational speed and a waveform of a detection signal outputted from a magnetic sensor for the detection of the position of origin;

DETAILED DESCRIPTION OF THE EMBODIMENTS

Figure 1:
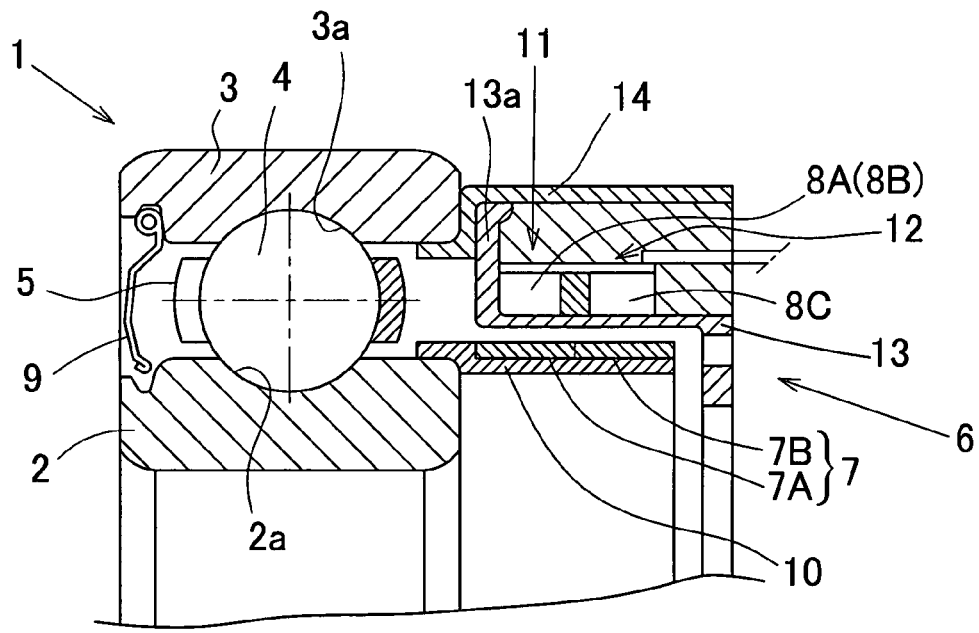
FIG. 1 is a fragmentary longitudinal sectional view of a bearing with integrated rotation sensor according to a preferred embodiment of the present invention.

A preferred embodiment of the present invention will now be described with particular reference to FIGS. 1 to 6. FIG. 1 illustrates a fragmentary longitudinal sectional view of a bearing with integrated rotation sensor 1 according to this preferred embodiment of the present invention. This bearing with integrated rotation sensor 1 includes rotating and stationary rings 2 and 3 rotatable relative to each other through a row of rolling elements 4, and a rotation sensor assembly 6 made up of a magnetic encoder 7, mounted on the rotating ring 2 for rotation together therewith, and three magnetic sensors 8A, 8B 8C secured to the stationary ring 3. The rotating ring 2 is rendered to be an inner race and the stationary ring 3 is rendered to be an outer race. An outer diametric surface of the rotating ring 2, which is in the form of an inner race, and an inner diametric surface of the stationary ring 3, which is in the form of an outer race, are formed with respective raceways 2a and 3a for a row of rolling elements 4. The rolling elements 4 are retained by a retainer 5. An annular space delimited between the rotating ring 2 and the stationary ring 3 has two open ends opposite to each other and one of those open ends of the annular space, which is remote from the rotation sensor assembly 6, is sealed by a sealing member 9.

Figure 2:
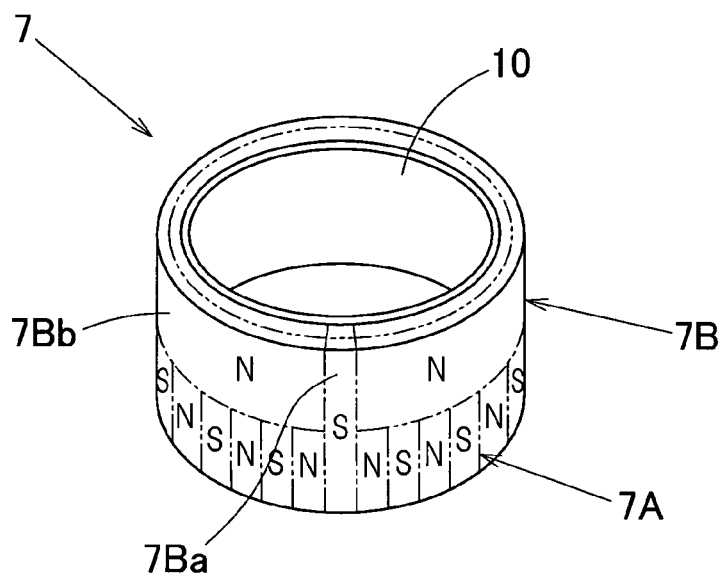
FIG. 2 is a perspective view of a magnetic encoder employed in the bearing with integrated rotation sensor.

The magnetic encoder 7 forming a part of the rotation sensor 6 is of a radial type with which detecting the magnetism is detected in a radial direction and is, as best shown in FIG. 2, rendered to represent an annular shape having a plurality of magnetic poles magnetized in a circumferential direction thereof. More specifically, the magnetic encoder 7 includes a cylindrical metal core 10 and first and second detecting members 7A and 7B provided on an outer periphery thereof. The magnetic encoder 7 is fixedly mounted on the rotating ring 2 through the metal core 10.

The first and second to-be-detected members 7A and 7B are of a ring shape, specifically a cylindrical shape and are juxtaposed relative to each other in an axial direction with coaxial arrangement. The first to-be-detected member 7A serves as a rotational speed to-be-detected member for use in detection of the rotational speed. This first to-be-detected member 7A has a radial thickness that is uniform all over the entire circumference thereof, and is in the form of a permanent magnet magnetized to have, on an periphery confronting the magnetic sensors 8A and 8B or on an outer periphery, a plurality of alternating magnetic poles N and S spaced an equal distance from each other in a direction circumferentially thereof. On the other hand, the second to-be-detected member 7B has a circumferential portion thereof connected with the first to-be-detected member (the rotational speed to-be-detected member for use in detection of the rotational speed) 7A and rendered to be an origin position to-be-detected element 7Ba for use in detection of the position of origin, which element 7Ba has a thickness equal to that of the first to-be-detected member 7A at any location in a direction circumferentially thereof. The remaining circumferential portion of the second to-be-detected member 7B, excluding the origin position to-be-detected element 7Ba, that is, a portion of the second to-be-detected member 7B continued from the to-be-detected element 7Ba in a direction circumferentially thereof is in the form of a permanent magnet which is so magnetized as to render the magnetic sensor 8C for use in detection of the position of origin to be a non-detecting level in order to form a magnetized restoration element 7Bb for use magnetic in restoration. An outer peripheral surface of the origin position to-be-detected element 7Ba is magnetized to one of the two alternating magnetic poles, for example, a magnetic S pole, which is the same pole as that of a circumferential portion, juxtaposed axially to the origin position to-be-detected element 7Ba, of the to-be-detected member 7A for detection of the rotational speed, and a peripheral surface of the magnetized restoration element 7Bb is magnetized to the other of the two alternating magnetic poles, for example, a magnetic north (N) pole, which is different from the magnetic pole of the origin position to-be-detected element 7Ba.

It is to be noted that in the illustrated embodiment, the first and second to-be-detected members 7A and 7B are made of a magnetic rubber material and are firmly bonded by vulcanization to the peripheral surface of the metal core 10 simultaneously with formation of the first and second to-be-detected elements 7A and 7B. It is also to be noted that the to-be-detected element 7Ba for use in restoration may be formed so as to extend a substantial distance in the circumferential direction, instead of being provided locally in a portion of the circumferential direction, but must be shorter in the circumferential direction than the magnetized restoration element 7Bb.

With respect to the manner of magnetizing the first and second to-be-detected members 7A and 7B, either one shot magnetization, in which both of the to-be-detected members are magnetized at the same time, or an indexing magnetization, in which the to-be-detected members are magnetized separately, may be employed. In the case of the indexing magnetization, after one of the first and second to-be-detected members 7A and 7B has been magnetized, the other of the first and second to-be-detected members 7A and 7B is magnetized with the magnetic encoder 7 or the magnetic yoke having been displaced axially. Where during the practice of this indexing magnetization, the first to-be-detected member 7A, for example, is first magnetized and the second to-be-detected member 7B is subsequently magnetized, an efficient magnetization can be accomplished by implementing the following manner.

Specifically, when it comes to magnetization of the first to-be-detected member 7A prior to that of the second to-be-detected member 7B, using as the starting point, one of the two N-pole magnetized portions of the first to-be-detected member 7A, which adjoins the S-pole magnetized portion axially adjoining the origin position to-be-detected element 7Ba in the second to-be-detected member 7B, the sequence of magnetization is performed in the circumferential direction away from the S-pole magnetized portion and, when such magnetization has proceeded to the S-pole magnetized portion axially adjoining the origin position to-be-detected element 7Ba, the site of magnetization is shifted to the origin position to-be-detected element 7Ba, followed by magnetization of the second to-be-detected member 7B.

Similarly, where the second to-be-detected member 7B is first magnetized prior to the first to-be-detected member 7A, using as the starting point, one of opposite ends of the magnetized restoration element 7Bb, which is an N-pole magnetized portion that sandwiches from circumferential directions opposite to each other, the origin position to-be-detected element 7Ba, which is an S-pole magnetized portion, the magnetization is carried out so as to proceed in the circumferential direction away from the origin position to-be-detected element 7Ba. When such magnetization has proceeded to the origin position to-be-detected element 7Ba, which is the S-pole magnetized portion, the site of magnetization is shifted to the S-pole magnetized portion of the first to-be-detected member 7A, which axially adjoins the origin position to-be-detected element 7Ba, followed by magnetization of the first to-be-detected member 7A.

Each of the magnetic sensors 8A, 8B and 8C may be in the form of, for example, a Hall IC element and is capable of outputting an incremental pulse signal in correspondence with change in magnetic poles N and S of the magnetic encoder 7, opposed to the respective magnetic sensor, as the rotating ring 2 undergoes rotation. The paired magnetic sensors 8A and 8B, which cooperate with each other to detect the rotational speed, and the magnetic sensor 8C for use in detection of the position of origin are arranged spaced axially a distance from each other. The paired magnetic sensors 8A and 8B and the first to-be-detected member (the to-be-detected member for use in detection of the rotational speed) 7A, which is held in face-to-face relation with the paired magnetic sensors 8A and 8B, altogether form a rotation sensor unit 11 for use in detection of the rotational speed. Also, the magnetic sensor 8C and the second to-be-detected member 7B, which is held in face-to-face relation therewith, altogether form a rotation sensor unit 12 for use in detection of the position of origin.

The three magnetic sensors 8A to 8C are, after having been inserted into a resinous casing 13 made of a resinous material, encapsulated with a resinous molding and are fitted to the stationary ring 3 with the resinous casing 13 fixed on the stationary ring 3 through a metallic casing 14 that covers radially outwardly thereof.

FIG. 3A illustrates the relation in position between the first to-be-detected member (the to-be-detected member for use in detection of the rotational speed) 7A and the paired magnetic sensors 8A and 8B for use in detection of the rotational speed. FIG. 3B illustrates the relation in position between the second to-be-detected member 7B and the magnetic sensor 8C for use in detection of the position of origin. The paired magnetic sensors 8A and 8B are so positioned relative to each other that the relation in phase in cyclic period of arrangement of the magnetic poles can give rise to a phase difference of substantially 90°.

FIG. 4 illustrates respective waveforms of various output signals generated from the rotation sensor 6. Specifically, Chart (A) represents the waveform of an output from the magnetic sensor 8A, Chart (B) represents the waveform of an output from the magnetic sensor 8B and Chart (C) represents the waveform of an output signal from the magnetic sensor 8C. The rotational speed, direction of rotation, and position of origin of the rotating ring 2 can be detected from those output signals. More specifically, the rotational speed can be detected from the output signal generated from either one of the magnetic sensors 8A and 8B, whereas the direction of rotation can be detected from the difference in phase between the output signal from the magnetic sensor 8A and the output signal from the magnetic sensor 8B. Also, the position of origin can be detected from the output signal generated by the magnetic sensor 8C.

Figure 5:
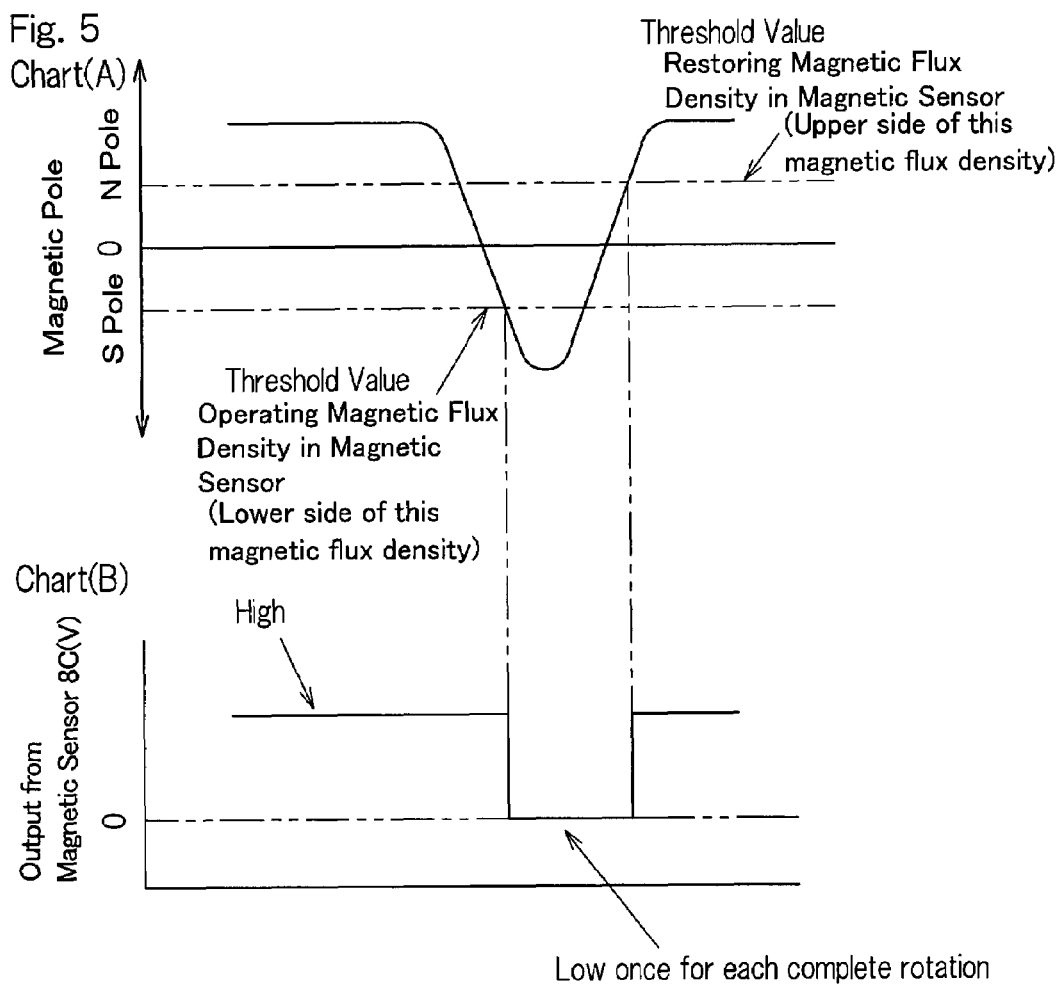
FIG. 5 illustrates a waveform of the magnetic flux density in the vicinity of a to-be-detected member for the detection of the position of origin in the second to-be-detected member and a waveform of an output signal from the magnetic sensor for the detection of the position of origin corresponding therewith.

FIG. 5 is an explanatory diagram used to explain the sequence of operation to detect the position of origin. Specifically, Chart (A) illustrates a change of a magnetic flux density in the vicinity of the origin position to-be-detected elements 7Ba (the magnetic pole S) in the magnetic sensor 8C and the restoration to-be-detected elements 7Bb (the magnetic poles N), which are positioned on respective sides of the to-be-detected element 7Ba in the circumferential direction, and Chart (B) illustrates the waveform of an output signal from the magnetic sensor 8C corresponding therewith.

When as the rotating ring 2 rotates, the to-be-detected element 7Ba, which is used in detection of the position of origin, in the magnetic encoder 7 approaches the magnetic sensor 8C and the density of magnetic fluxes acting on the magnetic sensor 8C exceeds a threshold value on the S-pole side, the output signal from the magnetic sensor 8C changes from a H (high) level state (a non-detection level) to an L (low) level state (a detection level). When the origin position to-be-detected element 7Ba moves past the magnetic sensor 8C and the density of the magnetic fluxes acting on the magnetic sensor 8C exceeds a threshold value on an N-pole side, the output signal from the magnetic sensor 8C is restored from the L level state to the H level state.

Thereafter, until the origin position to-be-detected element 7Ba approaches the magnetic sensor 8C next time, the magnetic flux density exceeding the threshold value on the N-pole side in the magnetized restoration element 7Bb continue to act on the magnetic sensor 8C and, accordingly, the output signal from the magnetic sensor 8C is maintained as restored to the H level state. Because of this, even though external magnetic fields leasing from outside act on the magnetic encoder 7, the magnetic sensor 8C can output, once for each complete rotation of the rotating ring 2, an output signal indicative of the position of origin without being adversely affected by the external magnetic fields.

Figure 6:
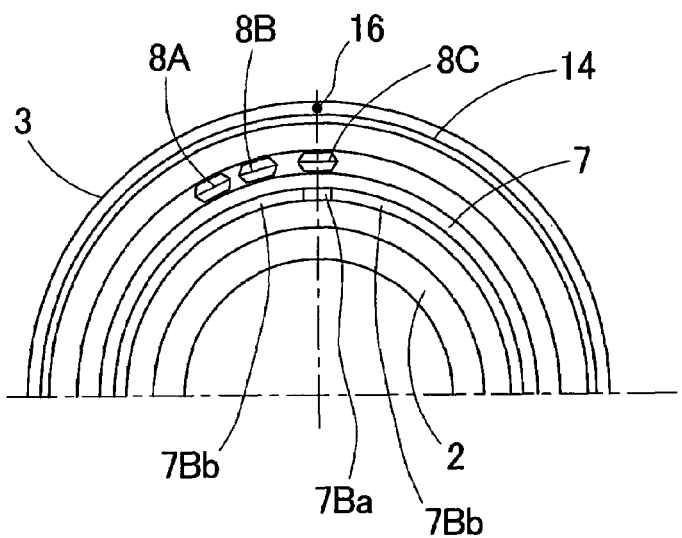
FIG. 6 is a fragmentary front elevational view of the bearing with integrated rotation sensor as viewed from one end thereof.

By manufacturing separately the origin position to-be-detected element 7Ba and a restoration element 7Bb, the origin position to-be-detected element 7Ba can be apparently discerned from the restoration element 7Bb. Also, as shown in FIG. 6, one of opposite end faces of the stationary ring 3, where the magnetic sensors 8A to 8C are disposed, is engraved, or otherwise embossed with a sensor fitting position indicator marking 16 indicative of the circumferential position at which the magnetic sensor for detecting the origin position to-be-detected element 7Ba in the magnetic encoder 7 is to be fitted. During assemblage of the bearing 1, the magnetic encoder 7 is fixed at an arbitrarily chosen position of the rotating ring 2 in the circumferential direction thereof, and the metallic casing 14 accommodating therein the magnetic sensors 8A to 8C is so fixed to the stationary ring 3 that the magnetic sensor 8C is aligned with the sensor fitting position indicator marking 16 on the stationary ring 3.

As hereinabove described, provision of a visually discernable portion in the magnetic encoder 7 and of the sensor fitting position indicator marking 16 in the stationary ring 3 is effective to allow the position of origin of the magnetic encoder 7 and the position of the magnetic sensor 8C for use in detection of the position of origin to be easily ascertained and, therefore, incorporation of the bearing 1 to a rotary shaft or a housing can easily be accomplished.

It is to be noted that where as shown in a sectional view in FIG. 1, the sensor casing 13 is provided with a radial collar 13a for covering an end face portion of the magnetic encoder 7, by forming a throughhole at a circumferential position of the collar 13a, at which the magnetic sensor 8C for use in detection of the position of origin, is arranged, the bearing 1 can easily be mounted on the rotary shaft by viewing the position at which the origin position to-be-detected element 7Ba in the magnetic encoder 7 can be aligned in the circumferential direction with the magnetic sensor 8C for use in detection of the position of origin.

According to the bearing with integrated rotation sensor 1 of the structure hereinbefore described in detail, despite that the bearing has the rotation sensor built therein for detection of not only the rotational speed, but also the position of origin and, yet, the direction of rotation, there is no need to arrange the rotational speed detecting sensor and the origin position detecting sensor separately. Because of this, assemblage can be accomplished easily and the simplified and compact structure can be attained.

In particular, since the bearing with integrated rotation sensor 1 is such that in the second to-be-detected member 7B of the magnetic encoder 7, the magnetized restoration element 7Bb is provided in the substantially entire circumference thereof except for the portion where the origin position to-be-detected element 7Ba is located, the position-of-origin detection signal can be assuredly outputted one time during each complete rotation of the rotating ring 2. Accordingly, it is possible to avoid an erroneous operation which would occur in detecting the position of origin as a result of influence brought about by the external magnetic fields leaking from outside.

Figure 7:
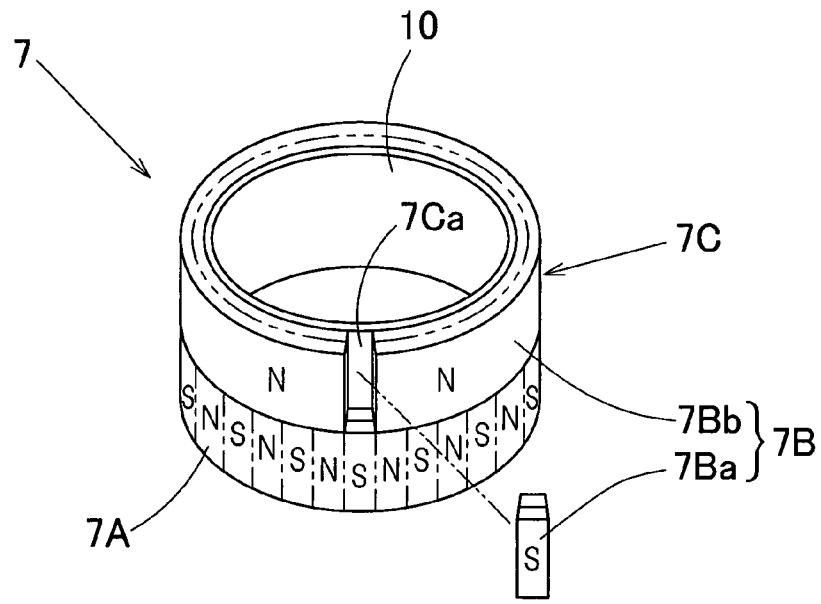
FIG. 7 is an exploded view showing an example of a different construction for the magnetic encoder employed in the bearing with integrated rotation sensor of the preferred embodiment.

FIG. 7 illustrates a different example of the construction of the magnetic encoder 7 employed in the bearing with integrated rotation sensor 1 according to the foregoing embodiment. In this magnetic encoder 7, the origin position to-be-detected element 7Ba is formed as a magnetic rubber component, which is separate from a magnetic encoder main body 7C, by means of a vulcanization molding technique. In such case, the magnetic encoder main body 7C includes a cylindrical metal core 10 having an outer periphery thereof bonded by vulcanization with a to-be-detected member 7A for use in detection of the rotational speed, which is the first to-be-detected member and is made of, for example, a magnetic rubber material, and a magnetized restoration element 7Bb in the second to-be-detected member 7B. A portion of the second to-be-detected member 7B, which eventually receives the origin position to-be-detected element 7Ba is depleted to form a depression 7Ca. The depression 7Ca may be either a thin walled portion of the magnetic rubber having a thickness smaller than that of the magnetized restoration element 7Bb, or an area where no magnetic rubber exist.

A component part, which eventually forms the origin position to-be-detected element 7Ba referred to hereinbefore is fitted, or otherwise bonded by the use of, for example, a bonding agent to the depression 7Ca to complete a magnetic encoder 7 of a structure similar to that shown in and described with particular reference to FIG. 2. The manner of magnetization of the magnetic poles is the same as that shown in and described with reference to FIG. 2. Magnetization of the component part which eventually forms the origin position to-be-detected element 7Ba may be carried out either prior to or after bonding of such component part to the depression 7Ca.

As hereinabove described, where the component part, which eventually forms the origin position to-be-detected element 7Ba, is prepared separately, the appearance of the to-be-detected element 7Ba can be discerned from any other components and, therefore, alignment in position in the circumferential direction relative to the magnetic sensor 8C for use in detection of the position of origin can be easily accomplished.

Figure 8:
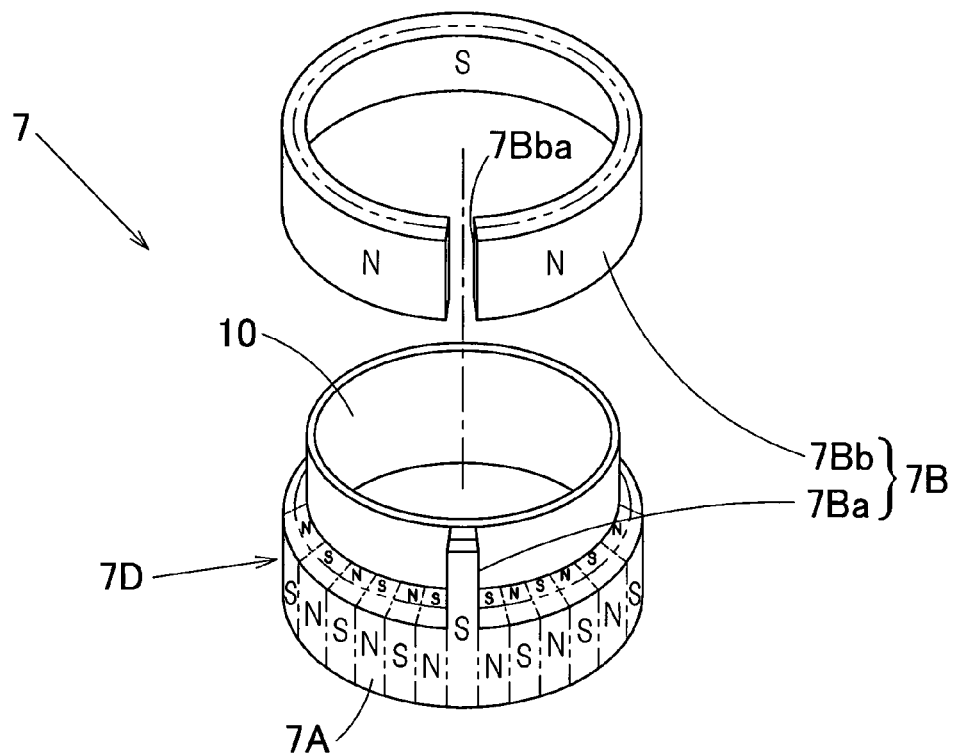
FIG. 8 is an exploded view showing an example of a further construction of the magnetic encoder employed in the bearing with integrated rotation sensor of the preferred embodiment.

FIG. 8 illustrates a further example of the construction of the magnetic encoder 7 employed in the bearing with integrated rotation sensor 1 according to the foregoing embodiment. In this magnetic encoder 7, the magnetized restoration element 7Bb in the second to-be-detected member 7B is formed by means of a vulcanization molding technique as, for example, a magnetic rubber component, which is separate from a magnetic encoder main body 7D that is the other portion of the magnetic encoder 7. In such case, the magnetic encoder main body 7D includes a cylindrical metal core 10 having an outer periphery provided with a to-be-detected member 7A for use in detection of the rotational speed and a origin position to-be-detected element 7Ba in the second to-be-detected member 7B is provided in a circumferential portion thereof in the form of a projection protruding axially from the to-be-detected member 7A for use in detection of the rotational speed. It is to be noted that in this magnetic encoder main body 7D, a circumferential portion thereof for receiving the magnetized restoration element 7Bb in the second to-be-detected member 7B may be in the form of a thin walled portion connected with the to-be-detected member 7A for use in detection of the rotational speed and having a thickness smaller than that of the to-be-detected member 7A.

A component part, which will eventually form the magnetized restoration element 7Bb, is so shaped as to represent a generally C-shaped configuration, defining a depleted portion 7Bba for receiving the origin position to-be-detected element 7Ba. The component part, which will eventually form the magnetized portion 7Bb, is mounted on the outer periphery of the magnetic encoder main body 7D so that this depleted portion 7Bba can receive therein the origin position to-be-detected element 7Ba in the magnetic encoder main body 7D, which origin position to-be-detected element 7Ba protrudes radially outwardly, and is bonded thereto by the use of, for example, a bonding material to thereby complete a magnetic encoder 7 of a structure similar to that shown in and described with particular reference to FIG. 2. The manner of magnetization of the magnetic poles is the same as that shown in and described with reference to FIG. 2. Magnetization of the component part which eventually forms the magnetized restoration element 7Bb may be carried out either prior to or after bonding of such component part to the outer periphery of the metal core 10.

As hereinabove described, even where the component part, which eventually forms the magnetized restoration element 7Bb, is prepared separately, the appearance of the origin position to-be-detected element 7Ba can be discerned and, therefore, alignment in position in the circumferential direction relative to the magnetic sensor 8C for use in detection of the position of origin can be easily accomplished.

Figure 9:
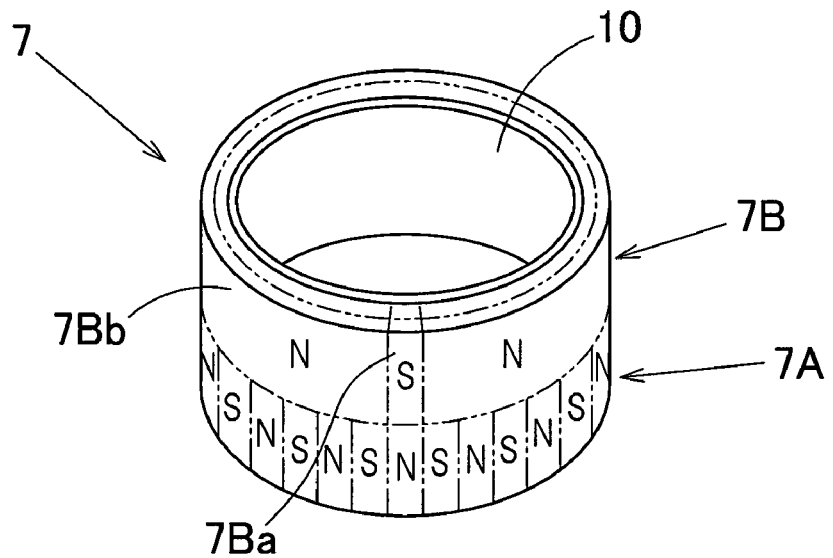
FIG. 9 is a perspective view showing a modified example of a still further construction of the magnetic encoder employed in the bearing with integrated rotation sensor.
Figure 10:
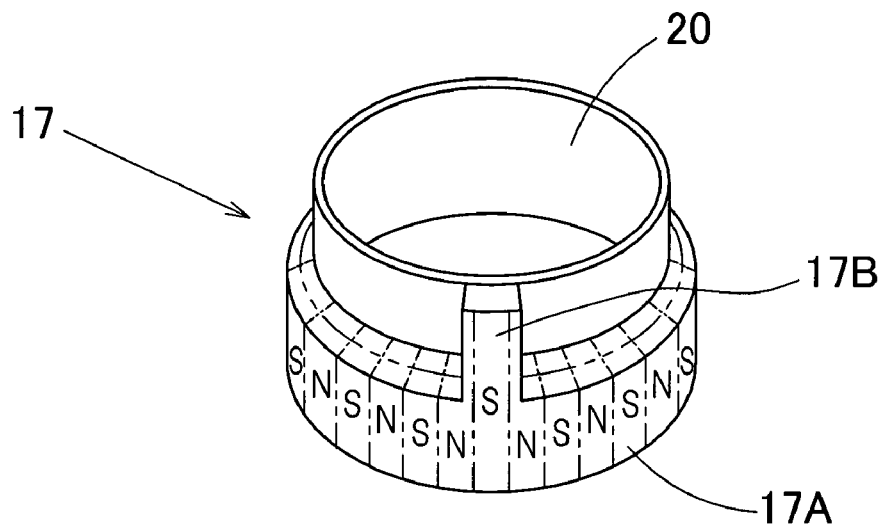
FIG. 10 is a perspective view of the prior art magnetic encoder.
Figure 11A:
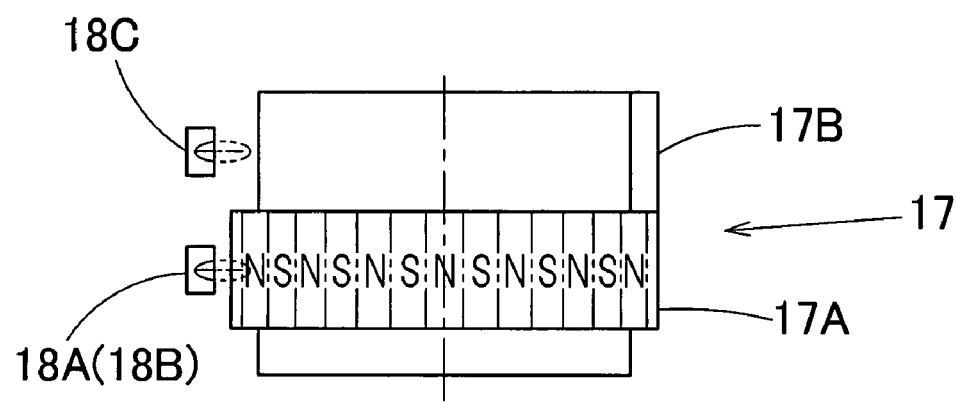
FIGS. 11A and 11B are explanatory diagrams used to explain the relation in position between the prior art magnetic encoder and the magnetic sensors cooperating with the magnetic encoder to form the rotation sensor.
Figure 11B:
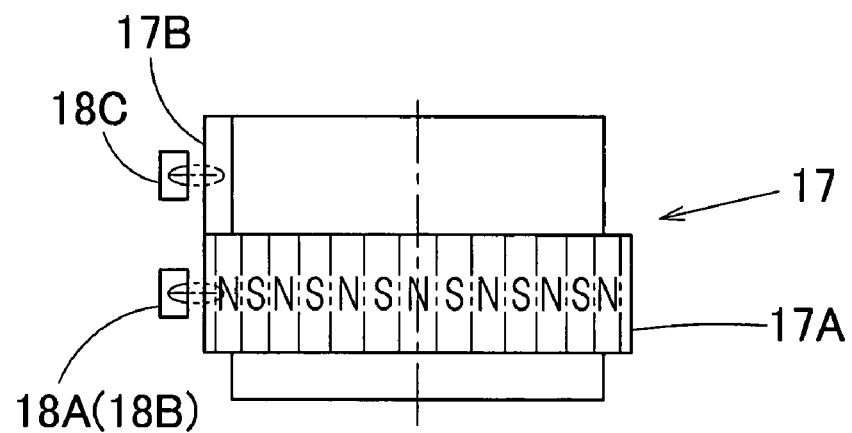

FIG. 9 illustrates a modified example of the construction of the magnetic encoder 7 employed in the bearing with integrated rotation sensor 1 according to the foregoing embodiment. This magnetic encoder 7 shown in FIG. 9 is substantially similar to that shown in and described with reference to FIG. 2, except that in this example, the origin position to-be-detected element 7Ba, which has been magnetized to the S pole in the second to-be-detected member 7B, is disposed at a location adjoining a portion magnetized to the N pole of the to-be-detected member 7A, i.e., the first to-be-detected member. Other structural features of the magnetic encoder shown in FIG. 9 are similar to those of the magnetic encoder 7 shown in and described with reference to FIG. 2.

It is to be noted that even in the case of the magnetic encoder 7 of the structure shown in any one of FIGS. 7 and 8, the origin position to-be-detected element 7Ba, which has been magnetized to the S pole, may be disposed at a location adjoining a portion magnetized to the N pole of the to-be-detected member 7A for use in detection of the rotational speed.

What is claimed is:

1. A bearing with integrated rotation sensor, which comprises:
    a rotating ring;
    a magnetic encoder mounted on the rotating ring and including a ring-shaped rotational speed to-be-detected member for use in detection of a rotational speed, which has a peripheral surface formed with a plurality of magnetic poles alternating relative to each other in a direction circumferentially thereof, and an origin position to-be-detected element for use in detection of an origin position axially juxtaposed to a portion of a circumferential direction of the rotational speed to-be-detected member;
    a stationary ring; and
    a rotational speed magnetic sensor for use in detection of the rotational speed and an origin position magnetic sensor for use in detection of the origin position, both mounted on the stationary ring and arranged so as to confront radially the rotational speed and origin position to-be-detected elements, respectively;
    wherein the magnetic encoder further includes a magnetized restoration element for use in restoration disposed in a axial portion thereof confronting the origin position magnetic sensor, and in an entire circumferential portion except the origin position to-be-detected element, for rendering the origin position magnetic sensor to be held in a non-detection level.

2. The bearing as claimed in claim 1, wherein the magnetized restoration element has a magnetic pole opposite to the origin position to-be-detected element.

3. The bearing as claimed in claim 2, wherein the origin position to-be-detected element has a magnetic S pole and the magnetized restoration element a magnetic N pole.

4. The bearing as claimed in claim 1, wherein the magnetic encoder is so constructed that the origin position to-be-detected element is employed as a component part separate from a magnetic encoder main body forming the remaining portion of the magnetic encoder, wherein the magnetic encoder main body includes a cylindrical metal core having an outer periphery thereof provided with the rotational speed to-be-detected member and the magnetized restoration element, and wherein a portion for receiving the origin position to-be-detected element is represented by a depression and the component part, which eventually forms the origin position to-be-detected element, is fitted inside the depleted depression.

5. The bearing as claimed in claim 1, wherein the magnetic encoder is so constructed that the magnetized restoration element is employed as a component part separate from a magnetic encoder main body forming the remaining portion of the magnetic encoder; wherein the magnetic encoder main body includes a cylindrical metal core having an outer periphery thereof provided with the rotational speed to-be-detected member; wherein the origin position to-be-detected element is provided in a circumferential portion thereof in a form of a projection protruding axially from the rotational speed to-be-detected member; and wherein the component part, which will eventually form the magnetized restoration element is so shaped as to represent a generally C-shaped configuration having a depleted portion and is mounted on the outer periphery of the magnetic encoder main body so that the depleted portion can receive therein the origin position to-be-detected element in the magnetic encoder main body, which protrude radially outwardly.

* * * * *